United States Patent [19]

Bertsch

[11] Patent Number: 4,754,608
[45] Date of Patent: * Jul. 5, 1988

[54] SQUEEZE FILM BEARING FOR STIRLING CYCLE COMPRESSOR PISTONS

[76] Inventor: Peter K. Bertsch, 68 S. Shaker Rd., Harvard, Mass. 01451

[*] Notice: The portion of the term of this patent subsequent to Mar. 11, 2003 has been disclaimed.

[21] Appl. No.: 6,006

[22] Filed: Jan. 21, 1987

[51] Int. Cl.$^4$ .............................. F25B 9/00
[52] U.S. Cl. ............................ 62/6; 60/520
[58] Field of Search .............. 62/6; 60/517, 520; 92/212, 187; 123/193 P

[56] References Cited

U.S. PATENT DOCUMENTS

| | | |
|---|---|---|
| 1,537,900 | 5/1925 | Talbot . |
| 2,084,949 | 6/1937 | Dorrell . |
| 2,394,409 | 2/1946 | Steenstrup . |
| 2,446,348 | 8/1948 | Webster . |
| 3,321,254 | 5/1967 | Dock . |
| 3,340,856 | 9/1967 | Brown . |
| 3,928,974 | 12/1975 | Benson . |
| 4,189,984 | 2/1980 | Tankred ........................ 92/82 |
| 4,206,609 | 6/1980 | Durenec ........................ 62/6 |
| 4,244,192 | 1/1981 | Chellis ........................ 62/6 |
| 4,501,120 | 2/1985 | Holland ........................ 62/6 |
| 4,539,818 | 9/1985 | Holland ........................ 62/6 |
| 4,543,792 | 10/1985 | Bertsch ........................ 62/6 |
| 4,574,591 | 3/1986 | Bertsch ........................ 62/6 |

Primary Examiner—Steven E. Warner
Attorney, Agent, or Firm—Hamilton, Brook, Smith & Reynolds

[57] ABSTRACT

In a compression piston, the wrist pin clearance bearing is lubricated by gas from the volume of working gas. The clearance bearing is formed by a wrist pin positioned within a pinhole of the piston. During reciprocation of the piston, the wrist pin oscillates in the piston pinhole and compresses the gas therein. The compression produces a squeeze film which prevents contact between the wrist pin and piston. The stroke time of the piston is not long enough during a cycle to collapse the squeeze film. The gas squeeze film thus lubricates the wrist pin clearance bearing. A clearance seal is formed between the piston and a cylinder of the piston housing. The clearance seal is of small clearance relative to the clearance bearing so that it limits leakage by the wrist pin. The small clearance seal also enables the requisite pressure buildup within the pinhole to generate an adequate squeeze film about the clearance bearing.

25 Claims, 2 Drawing Sheets

4,754,608

SQUEEZE FILM BEARING FOR STIRLING CYCLE COMPRESSOR PISTONS

BACKGROUND OF THE INVENTION

A typical Stirling cycle cryogenic refrigerator includes a compressor with a reciprocating piston. The reciprocating piston provides a near sinusoidal variation in the pressure of a working fluid. This working fluid fills a volume which includes the head space above the compressor piston and internal voids in a refrigerator cold finger. In the case of a split Stirling system, the working volume also includes a gas line interconnecting the compressor and the cold finger. Within the cold finger, a displacer moves in timed relationship with the sinusoidal pressure variations of the working fluid to provide cooling at one end of the cold finger.

Typically, Stirling cycle refrigerators include an electric motor driven compressor, and the invention will be described with reference to split Stirling cycle refrigerators of that type. In prior art compressors, the dynamic seal about the compressor piston has generally been an annular lip or a split ring seal.

One problem encountered when such compressors are used in split Stirling systems is leakage, past the dynamic seal, between the reciprocating piston and its surrounding housing. This leakage results in gas flow between the working volume at the headspace of the piston and a control volume or dead space to the rear of the piston. Where there is greater leakage in one direction than in the other during reciprocation of the piston, the mean pressure of the working fluid tends to rise or fall. Typically, refrigerators are designed about a certain designated mean pressure of working fluid. Therefore, as the seals deteriorate with compressor usage and the mean pressure of working fluid changes, a drop in refrigerator efficiency occurs. This drop in efficiency results in high energy usage and lower refrigerator capacity.

More recently, compressors of this type have been designed with clearance seals which are more resistant to wear and therefore have a longer life than seal rings. Further, such clearance seals are less likely than seal rings to inject contaminates into the working fluid that might degrade refrigerator performance. An example of this type of seal may be found in U.S. Pat. No. 4,539,818 issued on Sept. 10, 1985 to Noel Holland.

The compressor piston is generally driven by a connecting rod which is connected to the electrical motor. This connecting rod generally oscillates about 10° with each rotation of the motor and reciprocation of the piston. A bearing therefore needs to be positioned between the connecting rod and the piston to allow for this oscillatory motion. In most instances, a ball or needle bearing is positioned around a wrist pin, which supports the piston. Such bearings need to be able to withstand extensive temperature changes and must operate in a substantially sealed environment so that bearing lubricants will not contaminate the working fluid.

SUMMARY OF THE INVENTION

The invention comprises a reciprocating piston assembly wherein a piston is positioned within a cylinder of a piston housing. The housing contains a volume of helium. The piston is joined to a connecting rod through a wrist pin in a pinhole of the piston. A clearance bearing is formed between the wrist pin and pinhole. During operation of the piston, the wrist pin compresses the helium in the pinhole and forms a squeeze film which lubricates the wrist pin clearance bearing. The piston is operated at a cycle speed in which the stroke time of the piston is less than the time it takes to collapse the squeeze film. Hence there is not enough time to push the wrist pin against the piston.

In a compressor driven by a connecting rod, it is the wrist pin in a piston pinhole which actually drives the piston. The wrist pin is connected to the connecting rod and reciprocates with each stroke of the connecting rod. More specifically, for each stroke of the connecting rod the wrist pin is brought from an initial gap position to a final gap position relative to the surface of the piston pinhole. The initial gap is the largest gap allowed between the wrist pin and piston during a cycle. The final gap is the smallest gap allowed between the wristpin and piston during a cycle. Toward the end of each stroke of the connecting rod, the working fluid across the wristpin is compressed such that a squeeze film is generated between the wrist pin and piston. Through the squeeze film, the wrist pin drives the piston to the end positions of its reciprocation. The squeeze film thus enables the wrist pin to drive the piston one stroke per stroke of the connecting rod. Also, the squeeze film prevents contact from being made between the wrist pin and piston for a certain amount of time depending on the stroke time of the piston. With the squeeze film being characteristic of each cycle of the compressor, applicant has concluded that even with helium gas, the dimensions of the piston, pinhole and wrist pin which define the squeeze film can be chosen such that the stroke time of the piston is less than the time it takes to collapse the squeeze film. Hence applicant uses the squeeze film to lubricate the wrist pin bearing which in turn allows for the rotational movement between the connecting rod and piston. Also the squeeze film occurs naturally during the piston cycle and therefore does not introduce an outside lubricant which prevents contamination of the working fluid.

It is to the above improvements of a wrist pin bearing in a compressor piston to which the present invention is directed.

In the preferred embodiment, the piston and wrist pin are hard and smooth, measuring over 60 on the Rockwell C scale and less than about 4 microinches (RMS). A clearance seal is formed between the piston and cylinder. The clearance seal limits leakage by the wrist pin and thereby maintains the squeeze film in the wrist pin clearance bearing. The radial gap of the clearance seal is an order of magnitude less than the radial gap of the wrist pin clearance bearing. The working gas of the piston is of relatively low viscosity, such as but not limited to air, freon, nitrogen, and helium. Gas lubrication of the clearance bearing is made possible by a sufficiently high cycle speed of the piston which is a function of the clearance between the wrist pin and piston and the viscosity of the working gas. The lubrication follows from the stroke time of the piston being shorter than the collapse time of the squeeze film produced within the clearance bearing.

BRIEF DESCRIPTION OF THE DRAWINGS

The foregoing and other objects, features, and advantages of the invention will be apparent in the following more particular description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
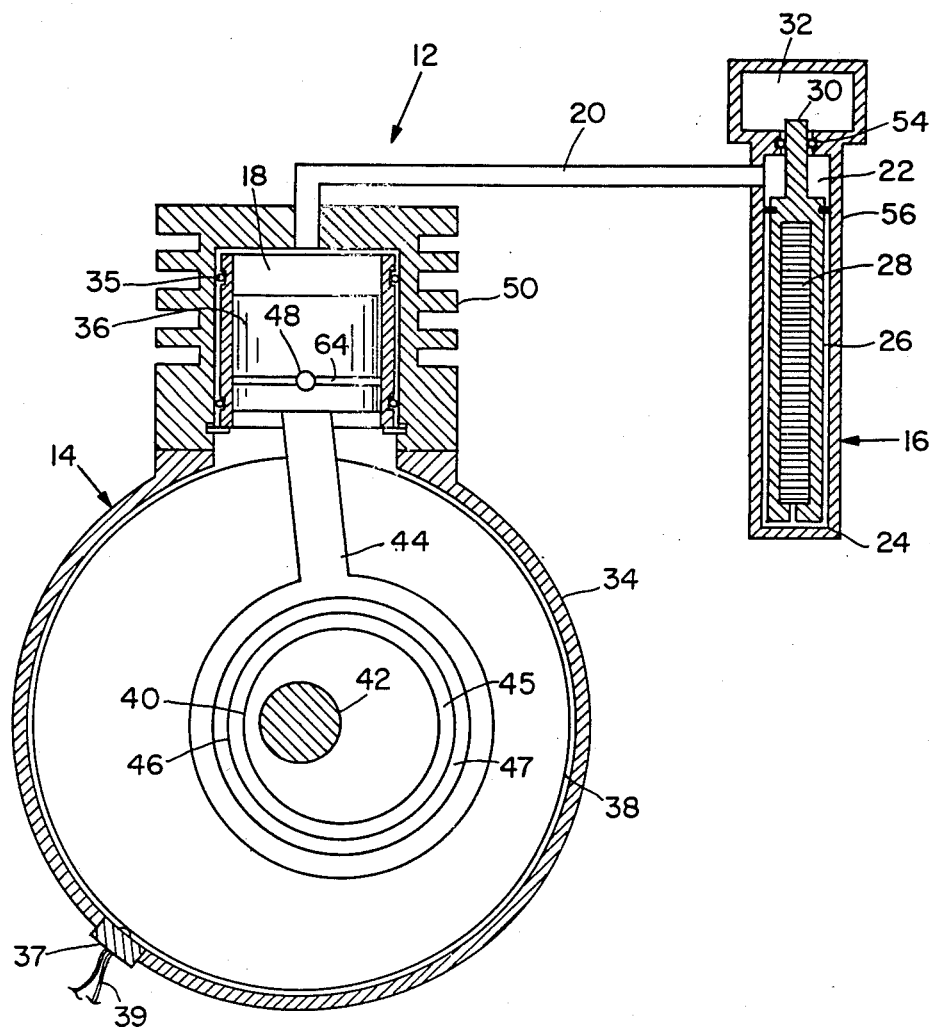
FIG. 1 is a schematic of a split Stirling cycle refrigerator system embodying the present invention

An ideal piston compressor operates in a smooth, efficient cycle. At one point in the cycle, the piston compresses working fluid at the piston head, and at an opposite point in the cycle it decompresses the fluid. The force and regularity with which the piston compresses and decompresses the fluid comes from the efficiency of the motor driven connecting arm. In order for the connecting arm to smoothly drive the piston, an effective linkage between the two must be made and maintained throughout operation of the compressor. A wrist pin connection is such a linkage which allows the connecting arm to efficiently drive the piston. In accordance with the present invention, a clearance bearing rather than more conventional needle bearings is provided between the wrist pin and piston. However, a clearance bearing in the piston pinhole needs proper lubrication to enable smooth cyclic operation. Further, the lubricant must be kept from contaminating the working fluid.

Applicant has found that a natural squeeze film from the working fluid can be generated during operation of the compressor and used to lubricate the wrist pin clearance bearing which allows for rotational movement between the connecting rod and piston. The wrist pin is positioned in a pinhole in the piston and is joined to the connecting arm. As the connecting arm drives the wrist pin in one direction, the wrist pin compresses working fluid within the pinhole between the wrist pin and piston. Such compression generates a squeeze film about the clearance bearing formed between the wrist pin and piston. The squeeze film is strong enough to drive the piston in the direction in which the connecting arm is driving the wrist pin. Before the squeeze film collapses under the piston load, the connecting arm moves in the opposite direction, having been fully extended in the one direction. The change in connecting arm direction causes the wrist pin to likewise change direction and to compress working fluid in that direction within the piston pinhole. The squeeze film is again produced about the clearance bearing, and the piston is driven in this opposite direction until the connecting arm reaches full movement in that direction. The connecting arm continues back to the first direction to complete a cycle and again this change in direction is before the squeeze film collapses under the piston load. The connecting arm continues to reciprocate and drive the wrist pin in a similar fashion within the piston pinhole. The motion generates a squeeze film about the clearance bearing and smoothly drives the piston to its compression and decompression positions.

Applicant has thus found that, even with low viscosity gases, at a high cycle speed which is a function of the dimensions of the clearance bearing and viscosity of the working fluid, the stroke time of the piston does not allow enough time to collapse the squeeze film. Hence, the naturally occurring squeeze film prevents contact from being made between the piston and wrist pin and allows for the rotational movement between the connecting rod and piston. The squeeze film therefore effectively lubricates the wrist pin bearing for a smooth operation of the compressor.

The above principle is now described as applied in a Split Stirling Cycle refrigerator.

A split Stirling cycle refrigeration system 12 is shown in FIG. 1. This system includes a reciprocating compressor 14 and a cold finger 16. The compressor produces a sinusoidal pressure variation in a volume 18 of pressurized refrigerant gas. That pressure variation is transmitted through supply line 20 to the cold finger 16.

The cold finger 16 comprises a cylindrical displacer or piston element 26. The displacer is free to move upward or downward and to thereby change the volumes of a warm space 22 and cold space 24. Displacer 26 houses a regenerative heat exchanger 28, which in this case is comprised of several hundred finely meshed bronze screen discs stacked to form a cylindrical matrix. Other common regenerators utilize packed balls instead of discs. Helium refrigerant gas flows through the regenerator between the warm space 22 and the cold space 24. A piston extension 30 extends upward from displacer 26 to the gas spring volume 32 at the warm end of the cold finger.

The compressor 14 comprises a gas tight housing 34 which encloses a reciprocating piston 36. The piston 36 is driven through a crank mechanism from an electric motor 38. The crank mechanism comprises a crank cam 40 affixed to a motor shaft 42 and a connecting rod 44. The connecting rod 44 is driven by the cam through a bearing 46 which is here formed by two close fitting ceramic sleeves 45 and 47. The connecting rod 44 in turn drives the piston 36 through the wrist pin 48. Electrical power is provided to the motor 38 from electrical leads 39 which pass through a fused ceramic connector 37. Heat generated by the compressor is convected to ambient air by heat dissipating fins 50 surrounding the compressor cylinder.

The refrigerator shown in FIG. 1 can been seen as including three isolated volumes of pressurized refrigerant gas. The crankcase housing 34 is thermetically sealed and contains a control volume, or dead volume, of pressurized gas below the piston 36. The piston acts on that control volume as well as the working volume of gas in space 18. The working volume of gas comprises the gas in the head space 18, supply line 20 and cold finger 16. The cold finger itself includes the warm space 22, cold space 24 and the voids within the regenerator 28.

The third volume of gas in the compressor is the gas spring volume 32. This volume of gas is sealed from the cold finger working volumes by seal 54 which surrounds the regenerator piston extension 30. A conventional piston seal 54 is shown but other seal arrangements may be used such as those described in U.S. Pat. No. 4,501,120 issued Feb. 26, 1985 to Noel J. Holland.

Figure 2:
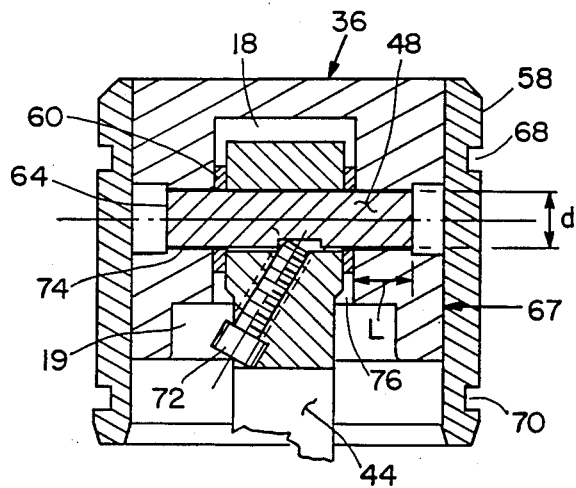
FIG. 2 is a cross section of the compressor piston of FIG. 1 and the cylinder head surrounding it.

FIG. 2 is an expanded cross section of the compressor of FIG. 1. This view of the compressor is rotated 90° from FIG. 1. The compressor of FIGS. 1 and 2 incorporates fixed cylinder 58 and piston 36 operating within cylinder 58 with a very tight clearance seal 67.

The piston 36 is preferably constructed of cermet or ceramic and reciprocates within a ceramic cylinder 58. The outer diameter of the piston is nearly the same as the inner diameter of the cylinder 58, and radial clearances between the two surfaces are about $1 \times 10^{-4}$ inches. Cylinder 58 is fixed to piston housing at 68 and 70 by "O" rings, and precision fitting is required in order to allow piston 36 to freely reciprocate in such confinement without binding. The piston and cylinder are constructed of ceramic or cermet material to minimize wear and to provide smooth clearance surfaces. Additionally, the gas refrigerant fills the small gap of the clearance seal 67 between the piston and the cylinder to provide lubrication to lessen the wear. Since the piston and the cylinder are of similar material, thermal expansion and contraction is not a problem.

Cermets are materials comprising ceramic particles bonded with metal. Typically, ceramics include compounds of metals or metal-like materials in groups 2, 3, or 4 of the periodic table combined with a non-metallic element. Typically, the non-metallic element would be carbon, silicon, or boron, and less often, oxygen, nitrogen, and sulfur. Ceramics are characterized by being hard and abrasion resistant. Examples of such ceramics include aluminum dioxide, berilium oxide, titanium dioxide, titanium boride, boron carbide, silicon nitride, and pyrolytic graphite. Selectively, other elements may be added to a ceramic to optimize its characteristics in use. Titanium carbide is mixed with alloy steels to form a preferred cermet sold under the registered trademark Ferro-tic.

Use of a cermet clearance seal element riding against a pure ceramic clearance seal element has been found to be particularly advantageous. Any debris which is generated from the ceramic is collected in the softer metal of the cermet. The ceramics in the two clearance seal elements still provide very hard surfaces of greater than 60 on the Rockwell C scale which is desirable for the clearance seal elements. Further, the ceramic in the two clearance seal elements eliminates galling. The cermet has an advantage over the ceramic in that it is more readily machined so the more complex of the two elements should be formed of cermet. In the present case, the piston is cermet.

The connecting rod 44 powers the piston 36 through the wrist pin 48. The connecting rod 44 holds the wrist pin 48 in pinhole 64 of piston 36. The wrist pin 48 is force fitted to connecting rod 44 through pinhole 64. A screw 72 or other mechanical means may be used to secure the wrist pin 48 to rod 44. A helium lubricated clearance bearing 74 is formed between the wrist pin 48 and the piston 36 about the surface of pinhole 64. The clearance bearing 74 provides a sufficient gap between the piston and the pin so that pressurized helium gas from the volume 19 flows past the wrist pin and enters into the gap 76 between the connecting rod and the piston head. This clearance bearing 74 between the wrist pin 48 and the piston 36 is a radial gap of about $1 \times 10^{-3}$ inches. The radial gap of the wrist pin clearance bearing 74 is an order of magnitude greater than the radial gap of clearance seal 67. With such an arrangement the piston clearance seal 67 limits leakage by the wrist pin 48, and enables the generation of a sufficient gas squeeze film about the wrist pin clearance bearing 74.

The clearance seal 67 may be considered a fluid resistance retarding the flow of gas between the work space 18 and dead space 19. Because of the near sinusoidal variation in work space pressure, there is a reversing pressure drop across the length of the seal 67, both above and below the wrist pin 48. The reversing pressure drop creates a dynamic pressure build up across the wrist pin bearing 74 which maintains a squeeze film from the helium gas about the pin bearing. It is this pressurized gas about the wrist pin bearing 74 that lubricates it to reduce friction and wear. The section of the clearance seal 67 between the groove 64 and backspace 19 is most important since without this fluid resistance, the wrist pin bearing 74 would assume the pressure of the backspace 19 along its entire length. Without a pressure differential along the length of the pin, there would be no gas squeeze film along the pin for proper lubrication of the bearing 74. Hence, piston 36 is positioned tightly within cylinder 58, forming clearance seal 67 which limits leakage by the wristpin 48 and thus aids in the generating and maintaining of the squeeze film for at least the duration of the piston load.

In the preferred embodiment, the wrist pin radial clearance is in the range of about 0.001 to 0.005 inches. The smaller clearance would require a faster cycle in order to generate a sufficient gas squeeze film to prevent contact. A lower speed may be maintained with the larger gap. However, too large of a gap leads to lost motion between the wrist pin and piston. For the gap range of about 0.001 to 0.005 inches the cycle speed should be at least 20 Hz and is preferably 25–50 Hz.

Like the piston 36 and cylinder 58, wrist pin 48 comprises a hardened steel or cermet to minimize wear and to provide smooth clearance surfaces. Tool steel and cermet are preferred materials for the wrist pin 48.

The hardness of the wrist pin and piston surfaces should be at least 60 on the Rockwell C scale and is preferably over 70 on the C scale. Further, the wrist pin 48 and piston pinhole 64 have a surface finish of less than about 4 micro inches (RMS) and preferably about 2 micro inches (RMS).

Washers 60 prevent the piston and connecting rod 44 from shifting from side to side relative to each other. The washers 60 are preferably constructed of tool steel or glass filled Teflon and are about 0.010 inches thick. A gap of 0.006 to 0.003 inches remains between the piston and the washers to permit passage of helium gas to dead space area 19.

The stroke time of the piston is the critical time of the cycle. The frequency of rotation defines the cycle speed and the inverse of such frequency defines the cycle period. With a cyclic speed of about 25 Hertz and a radial clearance seal 67 of about 0.001 inches, the cyclic load on the piston 36 does not have time to push the wrist pin 48 against the piston 36. This is due to the piston stroke time being shorter than the time required to collapse the gas film squeezed between the wrist pin 48 and the piston 36 during operation of the compressor 14. During startup, an insubstantial amount of contact is made, but little or no wear results.

The collapse time is represented by the equation:

$$t = \frac{L \mu d^3}{2w} \left( \frac{1}{h_2^2} - \frac{1}{h_1^2} \right) \tag{1}$$

where t is the collapse time in seconds, L is the length of the bearing, $\mu$ is the viscosity of the lubricating gas, d is the diameter of the wrist pin 48, $h_1$ is the initial gap between the wrist pin 48 and piston 36, $h_2$ is the final gap at which a sufficient gas film is maintained, and w is the applied load. The final gap $h_2$ is a function of the smoothness of the pinhole, piston and pin surfaces. The two surfaces should be on the same order of magnitude of smoothness. Hence, both have a surface finish less than about 4 microinches (RMS). Where there is roughness, the possibility of contact being made between the piston and the wrist pin depends upon peak surfaces of the rough areas. In that case, a larger final gap $h_2$ is required. Conversely, if the piston pin hole and wrist pin surfaces are smooth then a smaller final gap $h_2$ is enabled.

It can be seen from equation (1) that as $h_1$ becomes much larger than $h_2$, then the factor $1/h_1$ becomes insignificant. Thus, for $h_{12} < < h_1$, $$t = \frac{L\mu d^3}{2w}\left(\frac{1}{h_2{}^2} - o\right) = \frac{L\mu d^3}{2wh_2{}^2} \qquad (2)$$

However, if $h_1$ becomes too large at high cycle speeds, the piston experiences a loss in motion relative to the wrist pin. Thus an $h_1$ which is large enough to make $1/h_1{}^2$ insignificant but small enough so that no loss of motion exists is preferred.

In the testing of the embodiment of FIGS. 1 and 2, a maximum load w on linkage is $22.246 \times 10^{-6}$ dynes (50 lbs-f) for piston 36. The length, L, of one side of clearance bearing 74 is about 1 cm. $\mu$, the viscosity of helium at 250 psig is about $190 \times 10^{-6}$ gm/cm sec. The diameter of wrist pin 48, d, is about 0.475 cm. Final gap $h_2$ is about 0.000254 cm ($1 \times 10^{-4}$ inch). Calculating t over half the working load for just the one side of the piston 36 with bearing length L, the collapse time equals about $14.19 \times 10^{-6}$ seconds. Where, as here, the cyclic speed is 25 Hertz, the cycle period is 40 milliseconds, and the duration of load w is not in excess of 10msec. Thus, using the load duration time of about $10 \times 10^{-3}$ seconds as the piston stroke time, the collapse time t of $14.19 \times 10^{-6}$ seconds is much less than the piston stroke time of $10 \times 10^{-3}$ seconds. A smaller stroke time or a larger collapse time is therefore needed.

From equation (2), a smaller $h_2$ produces a larger collapse time t. With hard, smooth and precision fitted wrist pin 48 and piston pinhole 64, a smaller final gap $h_2$ is made possible. If $h_2$ is about $2 \times 10^{-6}$ inches, then collapse time t is calculated to be $35.5 \times 10^{-3}$ seconds which satisfies the need of a short piston stroke time at $10 \times 10^{-3}$ seconds relative to the collapse time. With $h_2$ at $4 \times 10^{-6}$ inches, collapse time t ($8.875 \times 10^{-3}$ seconds) about equals piston stroke time of $10 \times 10^{-3}$ seconds and establishes a threshold measurement of $h_2$. Thus, a compressor, as shown in FIGS. 1 and 2 with the designated wrist pin 48, clearance seal 67, clearance bearing 74, load w and cycle speed of 25 Hertz, must have a final gap $h_2$ less than about $4 \times 10^{-6}$ inches, and preferably about $2 \times 10^{-6}$ inches, in order to enable the working helium gas to lubricate the clearance bearing 74 through a squeeze film.

From the above, it is at the relatively faster cycle speeds and with smaller final gaps $h_2$ that the squeeze film lubricant is most adequately produced. In order to obtain the final gaps $h_2$ in the range of about $2 \times 10^{-6}$ inches to about $4 \times 10^{-6}$ inches, the piston 36 and pin 48 must have very smooth surfaces. It is preferred that the smoothness be in the order of magnitude of final gap $h_2$.

The use of a helium lubricated wrist pin 48 has several advantages over other types of bearing that have been previously utilized for the same purpose. In the type of compressor described herein, caged bearings are generally too large and sleeve bearings are generally too fragile. It is, therefore, common in small compressors to use a full complement needle bearing between the wrist pin and piston. Grease packed needle bearings tend to generate high frequency noise from roller movement within the bearing. The rollers tend to rap against each other and the wrist pin. Further, grease from the greased-filled bearing can escape into the helium environment. Such contamination can lead to a degradation in refrigerator efficiency. These problems are avoided by the helium lubricated wrist pin 48 which is almost noiseless and from which there is virtually no chance of contamination due to the squeeze film being a natural occurrence of the working fluid itself.

It is also appreciated that the working fluid may comprise other relatively low viscosity gases other than helium. A viscosity of less than about $250 \times 10^{-6}$ gm/cm- seconds at 20° centigrade is suitable. A sufficient squeeze film may be generated from the dynamic pressure build up across the wrist pin bearing from working volumes of, but not limited to, air, freon, nitrogen and any mixture thereof.

Figure 3:
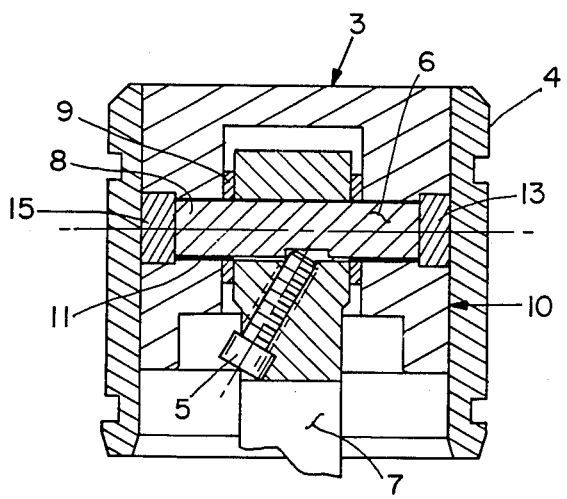
FIG. 3 is the cross section of a cylinder head embodying the invention with improvements for reducing noise and contamination.

FIG. 3 is a cross section of another embodiment of the invention which optimizes noise reduction and prevention of contamination. This embodiment has a piston 3 comprising Ferro-Tic. The piston 3 is positioned within ceramic sleeve 4 forming a clearance seal 10 much like that in the embodiment of FIGS. 1 and 2. Likewise, wrist pin 6 is positioned within a pinhole 8 of piston 3 forming a clearance bearing 11. Set screw 5 connects wrist pin 6 to aluminum connecting rod 7. This prevents wrist pin 6 from rotating within the piston pinhole 8 and rod 7, which would cause fretting of connecting rod 7 and noise. Further, thrust washers 9 prevent noise by positioning connecting rod 7 concentric to piston 3. The washers 9 help maintain this concentric position during operation of the piston 3. The washers 9 are in all other respect similar to washers 60 of FIG. 2.

In order to prevent any debris from reaching the clearance seal 10, porous plugs 13 and 15 are fitted, one at each end, into the piston pinhole 8. Because the plugs 13 and 15 are porous, the pressurized working gas is still able to flow through and lubricate clearance bearing 11, as in the embodiment of FIGS. 1 and 2. At the same time, the pores of plugs 13 and 15 are small enough to prevent the passage of debris from the clearance bearing 11 to the clearance seal 10. The plugs 13 and 15 preferably comprise stainless steel.

In all other respects, the piston 3 operates and allows for gas lubrication of clearance bearing 11 along the same principle as the embodiment in FIGS. 1 and 2.

While the invention has been particularly shown and described with reference to the preferred embodiments thereof, it will be understood by those who are skilled in the art that there are changes in form and detail that may be made without departing from the spirit and scope of the invention as defined by the appended claims.

I claim:

1. A cryogenic refrigerator for operating at cryogenic temperatures comprising a compressor which has a piston that is driven by a connecting rod through a wrist pin, said wrist pin being positioned in a pinhole of the piston and forming a clearance bearing therein; said bearing being lubricated solely by compression of gas from a working volume of gas of the compressor within the pinhole such that a squeeze film is produced about the bearing.

2. A refrigerator as claimed in claim 1 wherein the working volume of gas and the gas within the pinhole is helium.

3. A refrigerator as claimed in claim 1 wherein the gas lubrication of the clearance bearing is enabled by a collapse time of the squeeze film being longer than stroke time of the piston.

4. A reciprocating piston assembly comprising:
a piston housing having a volume of helium;
a cylinder within said housing;
a piston positioned within the cylinder;
a wrist pin extending through a pinhole in the piston, the pinhole being open to the volume of helium, the wrist pin and pinhole forming a small clearance bearing extending across the length of the wrist pin, the clearance bearing being lubricated solely by the wrist pin compressing the helium within the bearing such that a squeeze film is produced therein; and
a connecting rod joined to said wrist pin at the center of the pinhole.

5. A compressor as claimed in claim 4 further comprising thrust washers placed between the connecting rod and piston, above and below the write pin, concentrically center the operation of the rod with that of the piston.

6. A compressor as claimed in claim 4 further comprising a set screw positioned in the connecting rod attaching said rod to the wrist pin in order to prevent the wrist pin from rotating within the connecting rod.

7. A compressor as claimed in claim 4 further comprising a porous plug at each end of the pinhole to prevent debris from reaching the working volume of helium.

8. A compressor as claimed in claim 4 wherein the helium lubrication of the clearance bearing is enabled by a collapse time of the squeeze film of the clearance bearing being longer than the stroke time of the piston.

9. A compressor as claimed in claim 8 further comprising a clearance seal formed between the piston and cylinder to limit leakage by the wrist pin such that the squeeze film is sufficiently maintained within the clearance bearing.

10. A compressor as claimed in claim 9 wherein the diametral clearance between the piston and cylinder is an order of magnitude less than the diametral gap of the wrist pin clearance bearing.

11. A piston assembly comprising:
a piston housing having a volume of low viscosity working gas contained therein;
a cylinder fixed within said housing;
a piston comprising hard, smooth material positioned within the cylinder;
a wrist pin comprising hard, smooth material extending through a pinhole in the piston, the pinhole being open to the volume of the working gas, the wrist pin and the pinhole forming a clearance bearing extending across the length of the wrist pin with a squeeze film produced in the clearance bearing throughout piston stroke by compression of the working gas within the pinhole due to reciprocation of the wrist pin under cyclic drive; and
a connecting rod joined to said wrist pin, the connecting rod operating with a cycle period in which the stroke time of the piston is shorter than the collapse time of the squeeze film produced in the clearance bearing, such that the bearing is lubricated solely by the squeeze film preventing the wrist pin and pinhole surface from making contact throughout piston stroke.

12. A compressor as in claim 11 wherein the stroke time of the piston is shorter than the collapse time, t, of the squeeze film where t is defined by the equation $$t = \frac{L\mu d^3}{2wh_2^2}$$

where L is length of the clearance bearing, $\mu$ is viscosity of the working gas, d is diameter of the wrist pin, w is applied load, and $h_2$ is a closest distance between the wrist pin and piston throughout piston stroke in which a sufficient gas film is maintained where $h_2$ is much less than a farthest distance between the wrist pin and piston throughout piston stroke.

13. A compressor as claimed in claim 11 wherein the wrist pin and piston comprise a material with a hardness number greater than about 60 on the Rockwell C scale and a smoothness of less than about 4 microinches (RMS).

14. A compressor as claimed in claim 11 wherein the low viscosity working fluid is helium.

15. A compressor as claimed in claim 11 wherein the piston is positioned within the sleeve to form a clearance seal, said seal limiting leakage by the wrist pin and thereby aiding in generating and maintaining the squeeze film for at least the duration of the piston load.

16. A compressor as claimed in claim 15 wherein the diametral gap of the clearance seal is an order of magnitude less than the diametral gap of the wrist pin clearance bearing.

17. A method of lubricating a clearance bearing, the steps comprising:
providing a hard smooth piston positioned within a cylinder of a piston housing having a volume of low viscosity working gas, said piston having a hard smooth wrist pin extended through a pinhole in the piston, the pinhole being open to the volume of working gas, and forming between the wrist pin and pinhole a clearance bearing extending across the length of the wrist pin such that a squeeze film is produced in the clearance bearing by compression of the working gas within the pinhole during reciprocation of the wrist pin and of the piston under cyclic load;
driving a connecting rod joined to said wrist pin at a cycle speed that produces a stroke time of the piston which is shorter than the collapse time of the squeeze film produced in the clearance bearing, such that the bearing is lubricated solely by the squeeze film preventing the wrist pin and pinhole surface from making contact.

18. A method of lubrication as claimed in claim 17 wherein the wrist pin and piston comprise a material with a hardness number greater than about 60 on the Rockwell C Scale and a smoothness of less than about 4 micro inches (RMS).

19. A method of lubrication as claimed in claim 17 wherein the low viscosity gas is helium.

20. A method of lubrication as claimed in claim 17 wherein the stroke time of the piston is shorter than the collpase time, t, of the squeeze film where t is defined by the equation $$t = \frac{L\mu d^3}{2wh_2^2}$$

where L is length of the clearance bearing, $\mu$ is viscosity of the working gas, d is diameter of the wrist pin, w is applied load, and $h_2$ is a closest distance between the wrist pin and piston throughout piston stroke in which a sufficient gas film is maintained where $h_2$ is much less than a farthest distance between the wrist pin and piston throughout piston stroke.

21. A method of lubrication as claimed in claim 17 wherein the step of positioning the piston within the cylinder includes forming a clearance seal between the cylinder and piston, said clearance seal limiting leakage by the wrist pin and thereby enabling the generation and maintenance of the squeeze film.

22. A method of lubrication as claimed in claim 21 wherein the clearance of the seal is an order of magnitude less than that of the wrist pin clearance bearing.

23. A piston driven by a connecting arm through a wrist pin which allows for rotational movement comprising a clearance bearing formed about the wrist pin and lubricated solely by compression of gas flowing through the clearance bearing from a working volume of gas, said compression producing a squeeze film about the clearance bearing.

24. A piston as claimed in claim 23 wherein the compressor gas is helium.

25. A piston as claimed in claim 23 wherein the gas lubrication of the clearance bearing is enabled by a collapse time of the squeeze film being longer than the stroke time of the piston.

* * * * *